Feb. 26, 1924.

M. T. SANDYS

BAROMETER

Filed March 20, 1923      3 Sheets-Sheet 1

1,485,152

Feb. 26, 1924.
M. T. SANDYS
BAROMETER
Filed March 20, 1923
1,485,152
3 Sheets-Sheet 2
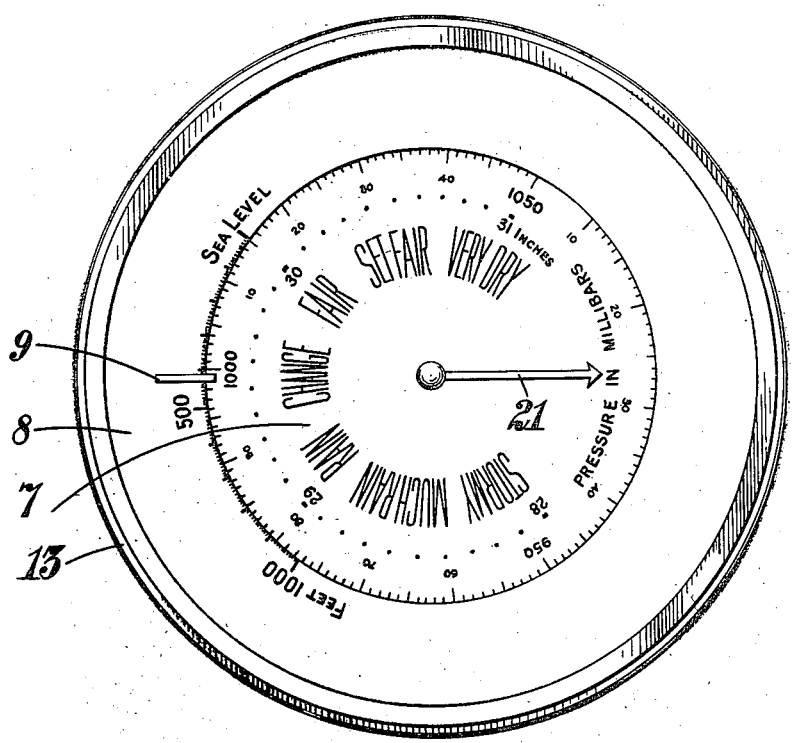
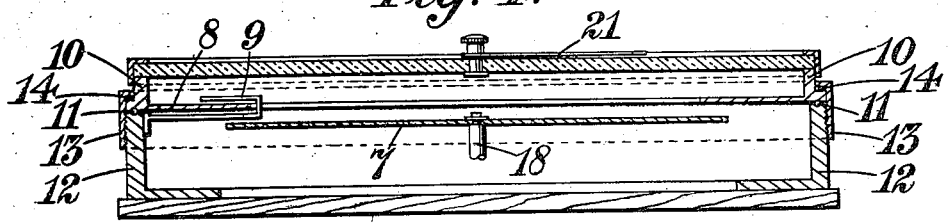

Feb. 26, 1924. 1,485,152
M. T. SANDYS
BAROMETER
Filed March 20, 1923   3 Sheets-Sheet 3

Patented Feb. 26, 1924.

1,485,152

UNITED STATES PATENT OFFICE.

MYLES TEIGNMOUTH SANDYS, OF ROCK, ENGLAND.

BAROMETER.

Application filed March 20, 1923. Serial No. 626,300.

*To all whom it may concern:*

Be it known that I, (Captain) MYLES TEIGNMOUTH SANDYS, a subject of the King of England, residing at Rock, Cornwall, England, have invented certain new and useful Improvements in Barometers, of which the following is a specification.

This invention is for improvements in or relating to barometers and has for its object to provide means whereby, with a single setting of the instrument, direct readings may be obtained simultaneously of the actual atmospheric pressure at the location of the barometer, the corresponding pressure at sea-level and the corresponding pressure at any other height.

According to this invention, a barometer having an altitude-scale arranged to be read against the pressure-scale is provided with an index cooperating with said altitude-scale and said pressure-scale and arranged to be set in relation to said altitude-scale so that the index may be set to the height at which the instrument is located, whereby the atmospheric pressure at that height may be readily ascertained.

A barometer as above set forth may comprise the combination of a pressure-scale mounted to rotate with the barometer-spindle, an altitude-scale arranged to be read against said pressure-scale, a fixed index on the instrument casing co-operating with said altitude-scale and said pressure-scale and means to permit adjustment of said altitude-scale relatively to said index.

According to a further modification of this invention, there may be provided a barometer comprising the combination of a fixed pressure-scale, an altitude-scale mounted to rotate with the barometer-spindle and arranged to be read against said pressure-scale, an index carried on said barometer-spindle and arranged to co-operate with said pressure-scale and said altitude-scale and means to permit adjustment of said index relatively to said altitude-scale.

In the accompanying drawings which illustrate preferred constructions according to this invention—

Figure 3 is a face view of another form of barometer;

Figure 4 is a central sectional elevation thereof;

Figure 1:
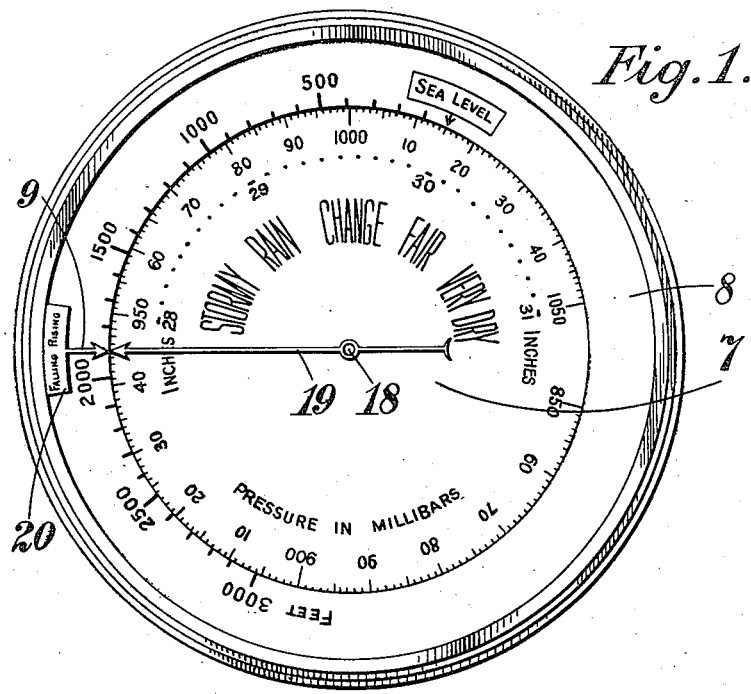
Figure 1 is a face view of one form of barometer.

The barometers are preferably of the "aneroid" type, but in the drawings the barometer mechanism is not shown as this may be of any preferred construction.

Like reference numerals indicate like parts throughout the drawings.

Figure 2:
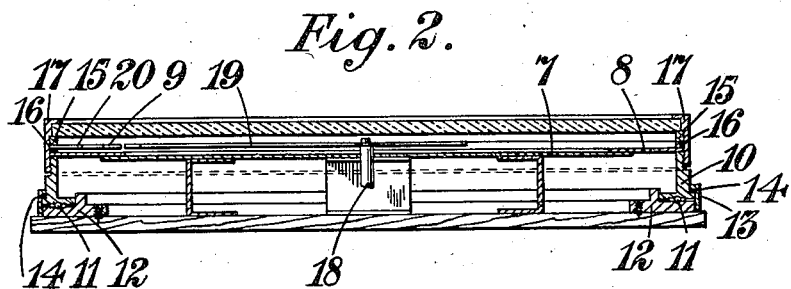
Figure 2 is a central sectional elevation thereof.

Referring to Figures 1 and 2, 7 is the usual barometer-dial graduated to show pressure, and 8 is the altitude-scale movable round the dial 7 and graduated as in an ordinary altitude-barometer. The index 9 is arranged so that it can be moved by hand over the altitude-scale when required and can be clamped to move with the scale.

The scale 8 is secured to a ring 10 which runs on ball-bearings 11 on the base ring 12. A clamping-ring 13 and felt washer 14 are provided to lock the ring against rotation when required. The index 9 is carried between rings 15 and 16 and a clamping-ring 17 screwed to the ring 10 serves to clamp the index to move with the altitude-scale. The barometer-spindle 18 carries an indicating-hand 19 which works over the pressure-scale, and the index 9 may carry a segment portion 20 bearing the words "Rising" and "Falling" so that the state of the barometer may be seen at a glance.

The height above sea-level at which the barometer is located is ascertained and the index is adjusted to this height on the altitude-scale and clamped. The barometer is then set by rotating the altitude-scale to bring the index into register with the indicating-hand 19. The pressure at sea-level can then be read on the pressure-scale opposite the zero of the altitude-scale, and the corresponding pressure at any other height may also be read against the appropriate graduation on the altitude-scale without further adjustment. The periodical setting of the instrument is performed by rotating the altitude-scale to bring the index into register with the indicating-hand: thus the customary setting-hand may be dispensed with.

If desired a second index may be provided movable relatively to the index 9 over a scale thereon. This second index may be adjusted to compensate for any known inaccuracy of the barometer and in this case the index 9 is clamped at the local height graduation on the altitude-scale and only the second or compensating index is arranged to register with the barometer-hand 19. Thus the instrument can be rendered absolutely accurate by calibration and preparation of a table of errors to be used with the compensating scale on the index.

Referring now to Figures 3 and 4, it will be seen that the pressure-scale 7 is mounted on the barometer-spindle 18 and rotates therewith. The index 9 is fixed to the base ring 12 on the instrument, and the altitude-scale 8 is carried by a ring 10 mounted on ball-bearings 11 to rotate relatively thereto.

The altitude-scale is provided with a clamping-ring 13 and washer 14. A setting-hand 21 may be provided on the glass face, if desired.

Obviously, with this instrument the index is set against the height at which the instrument is located by rotating the altitude-scale until the corresponding graduation thereon lies beneath the index. The pressure-scale moves round according to the variations of atmospheric pressure and reading of the actual pressure at the location of the instrument are taken opposite the index. The corresponding pressure at sea-level and at any other heights can be read against the appropriate marking on the altitude-scale.

Figure 5:
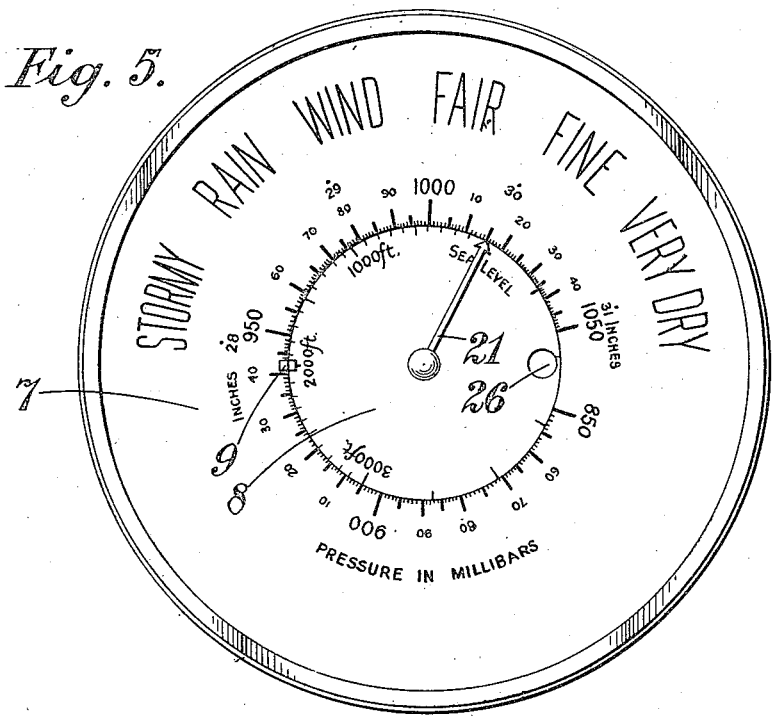
Figure 5 is a face view of yet another form of barometer.
Figure 6:
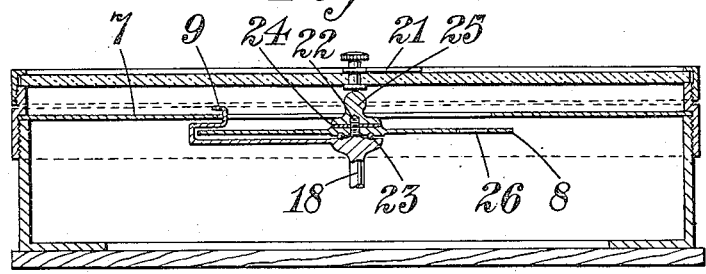
Figure 6 is a central sectional elevation thereof.

In the construction shown in Figures 5 and 6 the annular pressure-scale dial 7 is fixed in the casing and the barometer-spindle 18 carries the altitude-scale 8 and index 9. The altitude-scale is mounted on a screw-threaded extension 22 of the spindle and a ball-bearing 23 is provided on the spindle-collar. A felt washer 24 and screw-cap 25 serve to clamp the scale to the spindle. The dial 8 is provided with a hold 26 in which a finger can be inserted to rotate the dial to set the height graduation required against the index 9. It will be seen that when the instrument has been set for a given height, as hereinbefore explained, the true pressure reading for that height will be given against the index and the corresponding pressures at sea-level, and any other height may be read opposite the appropriate graduations on the altitude-scale. In this instrument also a setting-hand 21 may be provided, if desired. In all cases, it is preferred to mark the zero of the altitude-scale in a conspicuous manner as shown.

It will be appreciated that the details of construction given herein are by way of example only and that modifications may be made without departing from the scope of the invention.

I claim:—

1. In a barometer, the combination of a pressure-scale, an altitude-scale arranged to be read against said pressure-scale, and an index co-operating with said altitude-scale and said pressure scale, said index and said altitude-scale being arranged to be set one in relation to the other.

2. In a barometer, the combination of a pressure-scale, an altitude scale rotatable relatively thereto, an index co-operating with said altitude-scale, said index and said altitude-scale being arranged to be set one in relation to the other, and means to clamp said index to rotate with said altitude-scale.

3. In a barometer, the combination with a spindle arranged to be rotated according to atmospheric pressure variations and a fixed pressure-scale, of an altitude-scale mounted to rotate with the spindle and arranged to be read against said pressure-scale, an index carried by said spindle and arranged to co-operate with said pressure-scale and said altitude-scale, said index and said altitude-scale being arranged to be set one in relation to the other.

4. In a barometer the combination of a casing, a pressure-scale fixed therein, a spindle journalled in said casing and arranged to be rotated according to atmospheric pressure variations, an arm on said spindle constituting an index co-operating with said pressure-scale, an altitude-scale adapted to rotate with said spindle and co-operating with said index, said altitude-scale being adjustable relatively to said index, and means to clamp said altitude-scale to rotate with the spindle.

5. In a barometer the combination of a casing, an annular pressure-scale fixed therein, a spindle journalled in said casing and arranged to be rotated according to atmospheric pressure variations, an altitude-scale mounted to rotate with the barometer-spindle and arranged to be read against said pressure-scale, an index carried by said spindle and arranged to co-operate with said pressure-scale and said altitude-scale, said index and said altitude-scale being arranged to be set one in relation to the other.

6. In a barometer the combination of a casing, an annular disc fixed therein and having a pressure-scale thereon, a spindle journalled in said casing and arranged to be rotated according to atmospheric pressure variations, a collar on said spindle, an arm on said collar having an index co-operating with said pressure-scale, a screw-threaded boss on said collar, a disc rotatably mounted on said boss and having an altitude-scale thereon co-operating with said index said disc being adjustable relatively to said index, and a nut on said screw-threaded boss to clamp said disc to rotate with the spindle, substantially as set forth.

7. In a barometer the combination of a casing, an annular disc fixed therein and having a pressure-scale on the front face thereof, a spindle journalled in said casing and arranged to be rotated according to atmospheric pressure variations, a collar on said spindle, a screw-threaded boss on said collar, a disc rotatably mounted on said boss, and having an altitude-scale on the front face thereof, said disc being arranged at the back of said annular pressure-scale disc and overlapping the inner periphery thereof, an arm on said collar at the back of said disc, an index on the free end of said arm formed to co-operate with the altitude-scale and the pressure-scale, said altitude-scale disc being adjustable relatively to said index, and a nut on said screw-threaded boss adapted to clamp said disc to rotate with the spindle, substantially as set forth.

8. In a barometer the combination of a casing, an annular disc fixed therein and having a pressure-scale thereon, a spindle journalled in said casing and arranged to be rotated according to atmospheric pressure variations, a collar on said spindle, there being a ball-race in said collar, an arm fixed to said collar having an index co-operating with said pressure-scale, a screw-threaded boss on said collar, a disc rotatably mounted on said boss and having an altitude-scale thereon, co-operating with said index, there being a ball-race in said disc, coincident with the race in said collar, a plurality of balls in said ball-races between said disc and said collar, and a nut on said screw-threaded boss to clamp said disc to rotate with the spindle, substantially as set forth.

9. In a barometer the combination of a casing an annular disc fixed therein and having a pressure-scale thereon, a face of transparent material fixed in said casing, above said pressure-scale, a spindle journalled in said casing and arranged to be rotated according to atmospheric pressure variations, a collar on said spindle, an arm on said collar having an index co-operating with said pressure-scale, a screw-threaded boss on said collar, a disc rotatably mounted on said boss and having an altitude-scale thereon, co-operating with said index, said disc being adjustable relatively to said index, a nut on said screw-threaded boss to clamp said disc to rotate with the spindle, a boss journalled in said face and an arm on said boss, substantially as set forth.

In testimony whereof I affix my signature.

MYLES TEIGNMOUTH SANDYS.